United States Patent [19]

Scarlett et al.

[11] Patent Number: 6,144,910
[45] Date of Patent: Nov. 7, 2000

[54] VEHICLE CONTROL APPARATUS AND METHOD

[75] Inventors: Andrew James Scarlett, Shefford; John Charles Lowe, Bedford, both of United Kingdom

[73] Assignee: New Holland North America, Inc., New Holland, Pa.

[21] Appl. No.: 08/948,694

[22] Filed: Oct. 10, 1997

[30] Foreign Application Priority Data

Oct. 23, 1996 [GB] United Kingdom .................. 9622087

[51] Int. Cl.[7] ..................................................... G06F 17/00
[52] U.S. Cl. ................................. 701/50; 701/48; 172/4.5
[58] Field of Search ................................. 701/50, 48, 53, 701/54, 61; 123/350; 172/4, 4.5, 7

[56] References Cited

U.S. PATENT DOCUMENTS

| 5,513,107 | 4/1996 | Gormley .................................. 701/48 |
| 5,615,654 | 4/1997 | Weisman, II et al. .................. 123/350 |
| 5,751,579 | 5/1998 | Hrovat et al. ............................ 701/71 |

FOREIGN PATENT DOCUMENTS 2250107  5/1992  United Kingdom .
8201354  4/1982  WIPO .

Primary Examiner—William A. Cuchlinski, Jr.
Assistant Examiner—Arthur D. Donnelly
Attorney, Agent, or Firm—Larry W. Miller; J. William Stader; Frank A. Seemar

[57] ABSTRACT

In the field of agricultural tractor and implement combinations, there have been numerous attempts at improving the efficiency of isolated sub-systems such as the engine, the implement control and the transmission. Such sub-systems have individually successfully been automated, but previous attempts to automate the entire control of a tractor during eg. plowing operations have previously failed. Accordingly, a control apparatus has been provided for a tractor/implement combination to include a control apparatus comprising a plurality of microprocessors. The microprocessors are arranged in a hierarchical control strategy that includes a steady state reference model of various performance parameters of the tractor/implement combination. The tractor/implement combination can therefore be controlled in an automated, integrated way such that the tractor operator does not have to operate any of the sub-systems while maximizing the performance against a chosen criterion such as minimum fuel consumption or maximum work rate.

45 Claims, 10 Drawing Sheets

VEHICLE CONTROL APPARATUS AND METHOD

BACKGROUND OF THE INVENTION

This invention relates to an apparatus and method for controlling a land vehicle. In particular, but not exclusively, the invention relates to such an apparatus and method for automatically controlling a vehicle. The invention relates to the controlling of on- and off-highway vehicles, especially excavators or agricultural tractors. Mechanized tractors have been widely used in agriculture, approximately since the commercialization of internal combustion engines. The introduction of mechanized tractors revolutionized farming in the sense that a tractor permits a small number of workers to carry out what would otherwise be labor-intensive operations, at comparatively high speeds.

For many years, tractor designers have concentrated their efforts on improving the efficiency of parts of tractors over which tractor operators have no influence during use of the machines.

Thus, for example, there have been numerous efforts directed towards improving the combustion efficiency of tractor engines; to providing a choice of gear ratios suitable for particular agricultural tasks; and to improving the performance of tractor wheel/tire combinations for particular types of farming. Such efforts have resulted in improvements in tractor performance throughout the Twentieth Century. However, it is now suspected that the scope for obtaining further improvements in farming efficiency by concentrating on individual sub-systems of tractors may be limited.

Patent no. GB 253566 discloses a closed loop control system for adjusting the position of a tillage implement such as a plough by altering the height of the implement on a four bar linkage. The control strategy involved constantly adjusting the implement depth in order to maintain a constant draught (i.e. the force needed to pull the implement through the soil). The basic principles of GB 253566 are found in virtually all modern tractor mounted implement combinations, albeit with the mechanical components originally proposed replaced by electro-hydraulics or, increasingly commonly, microprocessor based control hardware.

In recent years, there have been moves to devise tractor control systems that attempt further to minimize the effects of the tractor operator's performance on the tractor's performance. The primary need for such systems arises when tractors are required to carry out operations, such as tilling of soil, with high accuracy and as rapidly as possible.

However, the majority of previous investigations attempt to automate only part of the operation of a tractor. The few previous attempts at automating virtually the entire operation of a tractor have hitherto failed. Thus there remains a need for an automated control system that removes from the working operations of the tractor as much as possible of the performance variability that can arise from actions of the tractor driver.

A tractor is a complex machine that is required to carry out a variety of tasks in widely differing physical conditions. Thus it would be desirable for any tractor control system to take account of variations in the sub-systems of the tractor/implement combination itself; variations in prevailing conditions; and the task required of the tractor/implement combination at any given time.

The variable sub-systems of the tractor include the following:

1. depending on the engine type, engine throttle setting or engine speed governor setting;
2. transmission ratio selected;
3. the setting of an adjustable implement hitch and/or the settings of the variable elements of an attached implement or accessory.

The variable elements of the implement will depend on the type of implement and the use to which it is put. For a tillage implement such as a plough, some relevant variables may include:

1. implement working depth; and
2. implement working width (when this is adjustable).

Further variables that are of particular significance in tillage operations include:

1. the soil specific resistance (ie. the resistance per unit area of the soil to cultivation or fracture). This determines, in conjunction with the other variable factors, the so-called "draught" of the implement;
2. the percentage slip at the vehicle driven wheels (i.e. the efficiency of the tractive effort at the wheel/soil interface);
3. the pull (i.e. force) measurable at the implement hitch; and
4. the forward speed of the vehicle.

Thus it will be seen that any control apparatus for automating all the controllable variables of a tractor/implement combination other than the steering (which in field conditions may ultimately prove impossible to automate) will necessarily be complicated.

EP-A-0070833 (Massey Ferguson Services NV) discloses optimization of the sub-systems of a tractor, using a central processor and a feedback loop. However, there is in the arrangement of EP-A-0070833 a necessary passivity in the system in the sense that an operator must specify various parameters such as the implement position (depth); the throttle setting; and the mode of optimization. (This can be selected eg. from a list including maximization of work rate and minimization of fuel consumption.)

Thus the arrangement of EP-A-0070833 is not a fully automatic control scheme since the controller does not seek to maximize the tractor performance in dependence on measured values eg. of soil strength, etc; but instead seeks to maximize the performance criteria against set values input by the driver. Such set values may or may not represent optima under the conditions prevailing at the time of use of the tractor.

In any event, the control scheme of EP-A-0070833 is not adaptive, since the apparatus cannot take account of changes in the field conditions over time.

The paper "Control Concept for a Tractor Management System" (LandTechnik, 50(2) 1995 pages 76 to 77) concerns a tractor optimization system that is integrated in the sense of controlling the transmission, engine output and implement. The arrangement disclosed employs a dynamic reference model of the optimization criteria stored in eg. the non-volatile memory (NVM) of a CPU. In other words, the reference model in the LandTechnik paper includes higher order physical variables. Thus the model includes data on accelerations, inertias and how they change with e.g. changing vehicle speed; and so on.

As in the arrangement of EP-A-0070833, in the arrangement disclosed in the LandTechnik paper the implement position, throttle setting, transmission ratio and type of work have to be input by the tractor operator before the system will attempt to optimize the tractor performance.

It may theoretically be possible to modify the arrangement disclosed in the LandTechnik paper to provide a fully automatic system in which e.g. the soil strength, and hence the variables dependent therefrom, are determined by the CPU. However, the authors of the paper suggest that in practice it will prove impossible to attain complete automation of tractor control systems using mathematical-physical reference models.

This view is believed to derive from the use in the LandTechnik paper of a dynamic reference model. Such a model is likely to be highly complex, and hence to require significant computing power to implement. Also, of course, dynamic models require data on e.g. accelerations, inertias, spring constants and other physical aspects of the tractor system that influence the tractor performance during use. Very often such measurements are in practice completely impossible to make, partly because of the inherently closed nature of some sub-systems of a tractor. This in turn would lead to the use of estimated values for such measurable variables. Unless such estimations could be made with complete confidence as to their accuracy, there is a risk of introducing errors into the dynamic model. The effects of such errors tend to multiply in use of dynamic models and could lead the performance of the control system to be worse than that of an operator driving a tractor/implement combination having no control systems.

Thus there are significant disadvantages associated with the use of a dynamic reference model in integrated, automatic control of tractor sub-systems.

U.S. Pat. No. 4,208,929 discloses an electronically controlled transmission system suitable for use in a tractor. Although this control system takes account of some measurable aspects of tractor performance, the control scheme disclosed does not operate on all the sub-systems of the tractor/implement combination in an integrated way, to provide automatic operation of tractor control.

FR-A-2723792 discloses a control system for a tractor/implement combination that seeks to optimize the vehicle performance during, e.g ploughing operations. The control program includes so-called "static" data, i.e. pre-recorded cartographical data on the field conditions likely to be encountered by the tractor/implement combination. However, the static data in FR-A-2723792 does not function as a reference model of the tractor/implement combination. In other words, the control program in FR-A-2723792 is not capable of modifying the settable parameters of the tractor/implement combination in real time, in dependence on instantaneously prevailing field conditions.

Also, there remains a need in FR-A-2723792 for the operator to input various data, such as the soil type, the characteristics of the implement, and a work criterion such as maximizing of fuel economy, maximizing work rate, and so on.

U.S. Pat. No. 4,267,569 discloses control of a motor vehicle diagnostic system. U.S. Pat. No. 4,747,301 discloses an automated performance monitor; U.S. Pat. No. 4,594,666 discloses a transmission control apparatus; U.S. Pat. No. 5,260,875 discloses an automated crop spraying system; and U.S. Pat. No. 5,305,215 discloses an expandable microprocessor system for an off-highway vehicle. However, none of the foregoing publications discloses what may truly be said to be an integrated control system for a vehicle such as a tractor/implement combination or an excavator.

Similarly, U.S. Pat. No. 4,098,346 discloses control of part of a tractor/implement combination sub-system (ie. the plough width); and U.S. Pat. No. 4,141,419 discloses a control system for controlling the approach angle of a plough unit in response to speed variations.

DE-A-4113191 and DE-A-3720334 disclose methods of adjusting the widths of plough bodies to take account of localized conditions, and U.S. Pat. No. 4,062,410 discloses an adjuster for the plough bottom.

U.S. Pat. No. 4,646,849 discloses an automatic controller for a reversible plough body, whereby the plough width is adjusted at the same time as the plough is reversed.

Finally, U.S. Pat. No. 4,778,013 discloses an apparatus for adjusting the angle of the mould boards of a series of plough bodies in response to the tractive force required to drive the plough through soil.

None of the foregoing disclosures discloses anything other than the control of an isolated sub-system of a tractor/implement combination.

SUMMARY OF THE INVENTION

According to a first aspect of the invention, there is provided apparatus for controlling an on/off-road vehicle, comprising:

a programmable controller including stored therein data representative of a reference model of the vehicle's performance;

one or more slave controllers respectively operatively connectable to a plurality of controllable sub-systems of a said vehicle, and operatively connected to the programmable controller;

one or more sensors, operatively connected to the programmable controller, for detecting the performance of said controllable sub-systems; and a comparator for comparing the detected performance of the said controllable sub-systems and the reference model, the controller being operable to control the said sub-systems in dependence on an output of the comparator, characterized in that the reference model is a steady-state model, whereby to permit coordinated, automated control of all the said sub-systems.

Thus the invention advantageously provides a control apparatus that permits fully automatic, optimized operation of a tractor/implement combination. In particular, a tractor control apparatus according to the invention permits a tractor operator to relinquish control of all aspects (other than the steering) of operation of a tractor during a field operation. If necessary, the automatic operation can be arranged to commence after execution of a calibration or a data acquisition period during which control of the tractor is under the influence of a human operator. However, the use of such a data acquisition period is not essential, and the apparatus of the invention may be arranged to control a tractor/implement combination from the outset of operations, if necessary with the apparatus adaptively modifying the control thereof during use.

For the avoidance of doubt, a "steady-state" reference model is herein taken to mean a reference model in which the physical characteristics of the tractor/implement assembly are regarded as fixed with respect to any particular instant in time. Thus, for example, parameters such as the mass of the vehicle and the moments of inertia of various sub-components thereof are taken to be constant, even though such parameters will in reality vary during operation of the tractor.

Also for the avoidance of doubt, the comparator of the invention may in preferred embodiments be implemented in hardware, in software, or in a combination of hardware and software.

Preferably the model of the apparatus of the invention includes data representative of the effect on vehicle performance of parameters selected from the set of:

engine performance data;

selected vehicle transmission ratio data;

vehicle tractive efficiency data; and data on the setting of a vehicle-powered implement.

Such a list of possible parameters has been found advantageously to facilitate construction of a steady-state model in the control apparatus. In particular, the set of possible parameters allows implementation of the apparatus as a hierarchical control scheme, with a principal microprocessor controlling a number of further microprocessors each associated with a sub-system of the tractor/implement combination.

Conveniently the model includes data, representative of the effect on vehicle performance, of the entire aforementioned set of parameters.

Conveniently the engine performance data includes engine torque-speed data and/or power-speed data.

Engine torque-speed data can be regarded as data on the torque developed by the engine at a given engine speed and governor or throttle setting, ie at a given fuelling level; and engine power-speed data can be regarded as an indication of the power developed by the engine. In other words, the principal parameters of engine performance are the engine torque, the engine speed and the engine fuel consumption rate.

The engine performance data may advantageously include data on the setting of the engine governor, i.e. the setting of the governor made on installation of the governor in the engine in a factory.

Conveniently the engine performance data is adjusted for vehicle driveline losses. Thus the model may also advantageously be tailored to a particular transmission, vehicle and engine combination.

Conveniently the vehicle transmission data is adjustable for driveline losses dependent on the vehicle transmission ratio under consideration. Thus, the model advantageously allows for variation of the transmission driveline losses with variation of the selected transmission ratio.

Preferably the vehicle tractive efficiency data includes data on the traction characteristics of a vehicle having a chosen wheel and tire combination when moving on a selected land surface. Thus, for example, it is possible for the model to take account of choices of vehicle wheels and tires and use of the vehicle on a range of surfaces such as wet and dry grass, wet and dry top soil, fallow or "set aside" land, partly and fully grown cereal and other crops, and so on. The vehicle tractive efficiency data may also optionally include data on the rolling resistance of a vehicle tire; and data respectively on the efficiency of traction of the front and rear wheels of a wheeled vehicle. Such data allows generation of as accurate a steady-state model as possible.

Conveniently, the respective data on the tractive efficiency of the said front and rear wheels are combined to provide composite traction data during use of the apparatus. Thus there is in preferred embodiments of the invention no need for separate analysis of the front and rear wheel traction data. This advantageously makes analysis of the tractive efficiency data computationally easier when the model is implemented in the non-volatile memory (NVM) of a microprocessor.

The vehicle tractive efficiency data may optionally include data selected from the set of:

soil type;

initial vehicle axle loads;

vehicle tire dimensions; and vehicle tire coefficients of rolling resistance (eg. front and rear coefficients).

Such data has been found to be readily susceptible to recordal as steady-state data thereby permitting construction of an accurate model.

Preferably the data on the setting of a vehicle powered implement includes data representative of the setting of an adjustable implement operatively mounted on the implement (three point) hitch of a tractor. In particular, such data may include data representative of parameters selected from the set of implement width; and implement depth setting.

Such choices of data for use in the model of the apparatus advantageously permit the model to take account of a range of vehicle powered implements, and in particular a plough the working depth and width of which preferably are adjustable.

Conveniently the apparatus includes a display device for indicating the performance of a vehicle to which the apparatus is connectable.

It is also preferable that the programmable controller and each of the slave controllers is constituted as a microprocessor, the microprocessors being operatively interconnected. This also assists in providing the control apparatus as a hierarchical control system.

In particularly preferred embodiments, the apparatus is suitable for automating the control of a tractor/implement combination, especially when operating in field conditions.

Even more preferably, the apparatus is suitable for automating the control of a tractor/implement combination including an agricultural implement secured to an implement hitch (e.g. a three point hitch) thereof.

Preferably, the controllable sub-systems to which the apparatus is connectable are selected from the set of:

an engine output controller;

a transmission ratio selector;

an adjustable implement controller; and a tractor implement hitch controller.

The aforesaid features advantageously permit manufacture of an apparatus that can readily be fitted either to new tractors, or, possibly, retrofitted to existing tractors.

The invention is also considered to reside in an on/off-road vehicle including an apparatus as defined hereinabove.

Conveniently the controllable sub-systems of the land vehicle are selected from the set of:

an engine output controller;

a transmission ratio selector;

an adjustable implement controller; and a vehicle implement hitch controller.

In preferred embodiments, all four such controllable sub-systems are connectable to a said control apparatus.

Conveniently the adjustable implement controller is connected to one or more of the following classes of implement:

a cultivation implement;

a crop establishment implement;

a material application implement;

a crop harvesting implement; and a materials handling implement.

The class "cultivation implements" includes but is not limited to ploughs or other kinds of cultivation implement. The class "crop establishment implements" includes but is not limited to seeders and drills. The class "material application implements" includes but is not limited to crop spray booms or other crop spraying apparatuses; fertilizer distribution apparatuses; and manure or slurry spreaders. The class "crop harvesting implements" includes but is not limited to mowers, tedders, harvester implements and bale wrapping and bale-forming apparatuses. The class "materials handling implements" includes but is not limited to excavator buckets and excavator shovels.

Conveniently the on/off-road vehicle is in the form of an agricultural tractor/implement combination. However, the invention is also considered to reside in any on/off-road vehicle having a plurality of controllable sub-systems, including an implement or tool drawing power from the vehicle.

According to a further aspect of the invention, there is provided a method of controlling a land vehicle, the vehicle including an adjustable, vehicle-powered implement. The method comprises the steps of:

initiating a control apparatus in particular as defined hereinabove;

inputting into the control apparatus a set value of an adjustable characteristic of the implement; and subsequently operating the vehicle under the control of the control apparatus, the control apparatus maintaining the adjustable characteristic of the implement at said set value while simultaneously automatically adjusting one or more sub-systems of the vehicle in order to optimize a performance parameter of said vehicle.

The method optionally includes the further step of:

operating the vehicle whereby to record in the control apparatus one or more characteristics of operation of the vehicle under contemporaneously prevailing conditions.

Thus, the method of the invention permits eg. a tractor operator to ignore virtually all aspects of operation of his tractor/implement combination during field operations.

Additional, preferred aspects of the method of the invention are defined in claims 30 to 34 and 36 to 52 appended hereto.

The remainder of this description is directed specifically to the implementation of the invention in agricultural tractor/implement combinations. The principles of the invention may equally well be employed in other on/off-road vehicles, if necessary with suitable modification.

BRIEF DESCRIPTION OF THE DRAWINGS

The advantages of this invention will be apparent upon consideration of the following detailed disclosure of the invention, especially when taken in conjunction with the accompanying drawings wherein.

DETAILED DESCRIPTION OF THE PREFERRED EMBODIMENT

Figure 1:
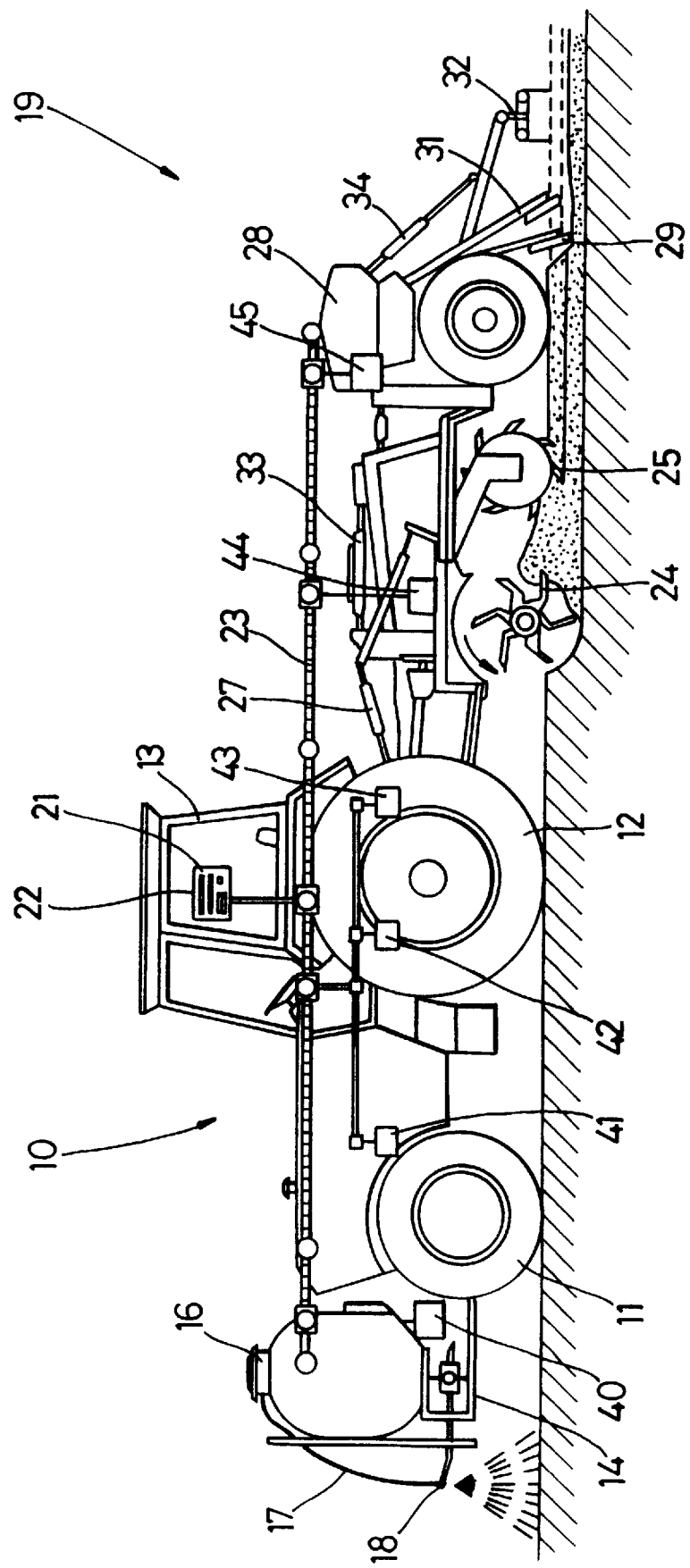
FIG. 1 is a schematic representation of a tractor including a forward-mounted crop spraying apparatus and a cultivation/drill assembly secured to a three point hitch.

Referring to the drawings, there is shown an agricultural tractor denoted by the reference numeral 10. In common with such vehicles in general, tractor 10 has front 11 and rear 12 pairs of driven wheels. Tractor 10 also has an engine (not shown in the drawings), a transmission system including a gear box, transfer box and appropriate differentials for the driven wheels; an operator cab 13 and a three point hitch at the rear of the vehicle between the rear wheels for attachment of an adjustable implement.

In the case of the FIG. 1 embodiment, the front carrier 14 of tractor 10 supports a tank 16 for a liquid such as an insecticide to be dispensed onto crops or soil by means of a pump, a delivery pipe 17 and a spray nozzle 18. In the FIG. 1 embodiment front carrier 14 is static relative to the tractor 10, but in alternative embodiments a front implement hitch could be provided that is adjustable relative to the tractor chassis. The control apparatus of the invention is capable of controlling adjustable features of such a hitch, in a manner integrated with the other sub-systems of the vehicle/implement combination.

A cultivation/seeder implement indicated generally by the reference numerals 19 & 28 is secured to the implement hitch of tractor 10 in the FIG. 1 embodiment.

Implement 19 includes first 24 and second 25 rotatable blade cylinders that engage the soil as the implement passes over it. The height of cylinder 25 relative to the soil is adjustable by means of manually adjustable link 27 in order to adjust the overall depth to which the implement tills the soil. A seeder unit 28 is towed behind the cylinders 24, 25 to seed the thus tilled ground. Seeder 28 includes seed placement coulters 29 and the heights of which are adjustable by means of actuators (not shown in FIG. 1). Seeder 28 also includes a following harrow 32 the height of which is adjustable using manually adjustable actuator 34. An hydraulic actuator 33 is used when the tractor/implement combination is turning at the end of a furrow, in order to "piggy back" the seeder onto the top of the cultivating implement, thereby reducing the moment needed to lift the entire implement clear of the ground.

The overall depth of the implement relative to the soil is determined by the (hydraulically adjustable) setting of the three point hitch of the tractor.

Thus the tractor/implement combination 10 may be regarded as comprising a plurality of controllable sub-systems, each of which influences the performance of the tractor in dependence on the prevailing conditions. The sub-systems include the engine (adjustable in one of two ways, ie. by means of a throttle setting or by means of an engine governor setting, depending on the engine type); the transmission (adjustable by virtue of selection of gear ratios); the tank/sprayer assembly 16,18 adjustable in terms of control of the spray pump and associated valve gear; and the cultivation/seeding implement 19,28 adjustable by adjustment of the positions of the various actuators.

Tractor/implement combination 10 includes a plurality of slave controllers for the sub-systems, in the form of microprocessors 40, 41, 42, 43, 44 and 45.

Certain parameters of the engine performance are controlled by means of an engine management system including microprocessor 41 that optimists engine performance in dependence on the throttle or engine governor settings input either by the tractor operator using suitable control members, or from a programmable controller constituted as a further microprocessor 21 (described in greater detail below) located in the cab of the FIG. 1 vehicle. The engine management system operates by adjusting various parameters, such as the metering volume of a fuel injection system, the timing of the fuel injection system, the boost pressure of a turbocharger (if present), the opening of engine valves and the opening of portions of the vehicle exhaust system, via suitable powered actuators such as solenoids.

Engine management microprocessor 41 may also be linked to an engine power boost assembly, by means of which the maximum output of the engine may be boosted for short periods, depending on a history of use of the power boost facility. The lengths and magnitudes of the respective power boosts are determined in part by the frequency with which power boost is requested in a period of tractor operation.

Tractor 10 includes a semi-automatic transmission system in which the transmission ratio selected is determined by a slave controller in the form of microprocessor 42 acting on one or more solenoids to engage and disengage gear sets of the gear box and/or gears of the transfer box, in dependence on the settings of a plurality of gear levers in the operator's cab or in dependence on signals from microprocessor 21.

Microprocessor (slave controller) 43 controls the positions of the elements of the implement (e.g three point) hitch. Again, the microprocessor 43 controls a number of actuators such as solenoids in dependence on the settings of control levers in the operator's cab 13 or on signals received from microprocessor 21.

Microprocessor 43 can be operated in three different modes, ie draught control mode, position control and TICS (Tractor Integrated Control System) mode, depending on command signals received from microprocessor 21.

In "draught control" mode, the tractor/implement is not controlled in an integrated, adaptive way. The position of the implement hitch is adjusted in dependence on the implement draught detected by a transducer. This control mode, which is per se known, can be overridden by a wheel slip override algorithm. This feature, also known per se, serves to adjust the implement depth in order to prevent wheel slip from exceeding a predetermined maximum.

In so-called "position control" mode, the tractor/implement is again not controlled in an integrated way. The implement hitch setting is notionally controlled in dependence on a demand implement depth input by the tractor operator. Although many tractor manufacturers have previously offered a position or depth control feature for cultivation implements, in practice such control modes have not existed because of the absence hitherto of integrated control systems for tractor/implement combinations. Thus in prior art tractor/implement combinations, the engine output, transmission ratio and implement width are not automatically adjusted to take account of changing soil strengths and wheel slip characteristics from place to place in a field. Consequently the tractor performance is not optimized and therefore the implement depth is adjusted solely in dependence on the wheel slip override algorithm. Thus a constant implement depth is not maintained in practice in the prior art "position control" schemes. The same is true of the apparatuses of FIGS. 1 and 2 when integrated (TICS) mode is not engaged.

Figure 2:
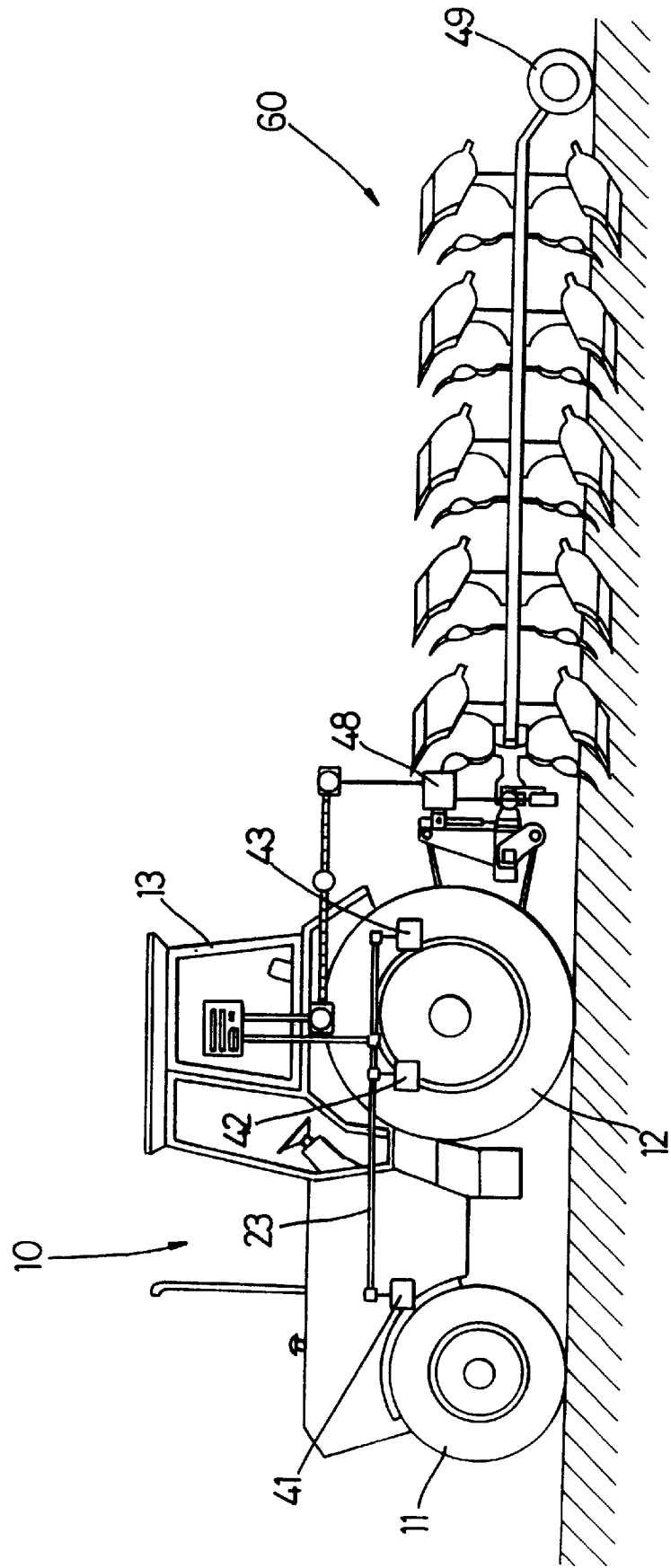
FIG. 2 is a similar tractor having an adjustable-width plough secured to the three point hitch.

When the apparatuses of FIGS. 1 and 2 operate in TICS mode, the depth or position of the implement is controlled to be constant, at a setting input by the tractor operator. The engine output and transmission ratio are constantly adjusted automatically to permit optimization of tractor performance whilst maintaining a truly constant implement depth setting. Only if wheelslip exceeds a predetermined amount (eg because of very localized conditions in the field) does a wheelslip control algorithm operate temporarily to adjust the implement depth and reduce the draught.

The pump and valve of the sprayer assembly 16,17,18 can similarly be controlled using microprocessor (slave controller) 40 and suitable actuators; and slave microprocessors 44 and 45 are present for controlling the actuators of implement 19 in a similar manner.

Microprocessor 21 in the embodiment shown lies within the cab 13 and is operatively connected to an operator interface/control unit 22. Microprocessor 21 includes in its NVM or a removable memory module a steady-state reference model of the operation of the tractor/implement combination when carrying out a variety of tasks under a variety of different field conditions. The reference model can be updated through use of the tractor/implement combination, in order to take account of contemporaneously prevailing field conditions such as soil strength and tractive efficiency. Thus the reference model may include some data that varies each time the vehicle is used; and some data, such as the mass of the vehicle hardware (i.e. those components whose masses do not alter during use of the tractor), the transmission ratios, the engine output at given engine speeds and torque loads, and so on, that are fixed.

A communication bus 23 interconnects the microprocessor 21 and all the microprocessors associated with the adjustable sub-systems.

Thus the controller 21 is able to control each of the microprocessors controlling the adjustable sub-systems, in an integrated, adaptive manner. Microprocessor 21 may be regarded as hierarchically the primary microprocessor of the vehicle shown. However it is theoretically possible for the reference model and the control algorithms present in microprocessor 21 to be distributed among a number of microprocessors. In such an arrangement a specific, primary processor 21 may be dispensed with. The invention is considered to include such embodiments.

The mode of control may be adjusted, as desired. For example, the microprocessor 21 may include stored therein a control algorithm that seeks to optimize the workrate of the tractor 10 when carrying out a chosen task.

Another algorithm representing another control mode may seek to minimize the specific or actual fuel consumption of the tractor.

A further algorithm may be selected to return control of the tractor sub-systems to the operator, who may then use the conventional cab-mounted levers and controls of the vehicle. Such a mode is necessary e.g. when the tractor 10 is driven on roads between field operations; and when turning in the headland at the end of a field, where it is thought that automatic control of the tractor 10 would offer no benefits. When such a mode is selected, the microprocessor 21 ceases to influence the microprocessors 40–45 until an automatic control mode is again engaged, but the microprocessors 40–45 may remain active throughout this period in order to provide independently controllable subsystems.

The integrated (TICS) mode of control may be disengaged in this way e.g when the operator depresses the brake or clutch pedal of the tractor, or performs some other operation indicative of an emergency. Alternatively, the TICS control mode may be automatically disengaged by the control software. Such disengaging may be temporary (e.g. to permit turning at the headland) or may be a final disengagement that occurs when the field operation is complete.

The various modes of operation need not be stored in any of the microprocessors. Indeed, there may be some benefit in providing the software for the various control modes in removable memory devices such as diskettes, so that a tractor user can purchase only the software that is of use to him. Similarly, modified versions of the reference model may be supplied in removable memory devices so that the control apparatus may be tailored to a farmer's individual requirements.

Referring now to FIG. 2, there is shown a second embodiment of the invention that is similar to the FIG. 1 embodiment in that it comprises a tractor/implement combination 10 having a plurality of controllable sub-systems, including a vehicle powered, adjustable implement in the form of fully-mounted, reversible plough 60. By "fully mounted" is meant an implement the depth of which is adjusted by the tractor implement hitch, and not by actuators on the implement itself. (The latter class of implement is generally referred to as a "semi-mounted" implement.) Thus the FIG. 2 implement is fully mounted notwithstanding the presence of a stabilizer wheel 49. However the ploughing depth may in alternative embodiments also be adjusted by virtue eg. of support wheels and/or remote actuators. Such ploughs may include additional sensors as necessary.

The sub-systems of the FIG. 2 embodiment are simpler than those of the FIG. 1 embodiment, because the sprayer assembly 16, 17, 18 is absent; and because the reversible plough shown includes only one form of adjustment, i.e. the plough width.

The FIG. 2 embodiment includes slave controllers in the form of engine management microprocessor 41, transmission microprocessor 42, hitch microprocessor 43 and plough control microprocessor 48. The last-mentioned microprocessor is operatively connected to actuators, e.g hydraulic actuators, for adjusting the width of the plough and for reversing the plough at the end of each furrow.

The control system of the FIG. 2 embodiment operates in ways analogous to the FIG. 1 embodiment to control the tractor 10 during field operations, in order to achieve an optimal result according to the mode of operation selected. The preferred mode of operation is one in which the engine and transmission are constantly adjusted to optimize performance while the implement and hitch microprocessors are commanded to maintain a constant implement depth.

In the FIG. 2 embodiment the control software constantly calculates the implement draught in kN, by the formula:

$$D = (C1 + C2.gs^2).d.w.n \quad (1)$$

in which:
D=draught (kN)
C1=static draught coefficient (kN/m$^2$) or soil strength
C2=dynamic draught coefficient ([kN/m$^2$]/[km/h]$^2$)
gs=ground speed (km/h)
d=working depth (m)
w=furrow width (m)
n=no. of furrows C2 is derivable from C1, that in turn is available from sensor measurements. In preferred embodiments of the invention, the transmission ratio, engine speed and (optionally) the implement settings are adjustable to take account of variations in the draught value D in order eg. to optimize workrate, minimize fuel consumption or otherwise control the performance of the vehicle/implement combination.

In the presently most preferred embodiment, in which the implement is a plough, the plough depth will be maintained constant throughout the ploughing operation. Thus adjustment of the implement is limited to width adjustments only—although (as is explained in more detail below) the software preferably is such as not to permit width adjustments to occur while the plough tills the soil. This feature ensures that the resulting furrows do not vary in width from one end to the other.

A further embodiment of the invention, not shown in the drawings, may be similar to the FIG. 2 embodiment except that the implement hitch has attached thereto a semi-mounted plough. Numerous other implements may equally well be secured to either the front or the rear of the tractor.

In use of the invention, the tractor operator initially powers up the tractor 10. This simultaneously initializses the microprocessor 21 and those of microprocessors 40–45 and 48 that are present. In preferred embodiments, the NVM of one of the microprocessors includes an algorithm capable of identifying the type of implement(s) attached to the tractor, e.g by means of suitable encoding information stored within the microprocessors such as microprocessor 48 for controlling the implement. This information is likely to indicate to the microprocessor 21 the nature of the task to be undertaken. However, where the implement is capable of carrying out a number of tasks, or if the implement identification facility is absent, the operator can enter relevant data on the type of task to be completed via the display/operator interface 22. The display 22 then prompts the operator to commence an operation, such as the ploughing of the first furrow of a field, in order to record in RAM of the microprocessor 21 the prevailing field conditions. The control apparatus optimists the performance of the tractor/implement combination during ploughing of the first furrow, but may initially lack information (acquired during the first pass) on the soil strength and slip characteristics. Such data may be acquired during eg. the first and/or another predetermined pass along the field. These are then assumed by microprocessor 21 to be constant unless the various transducers on the vehicle detect changes in the prevailing conditions ( as may occur e.g. if the weather conditions change part way through an operation). Thus the control apparatus of the invention is capable of adaptive learning.

If appropriate, the display/interface 22 may prompt the operator to input the desired mode of optimization, e.g. minimum fuel consumption; maximum workrate, etc. When a plough is attached to the hitch, the operator will generally be prompted to input the implement depth that subsequently the software will maintain constant while adjusting the variable sub-systems as explained above.

Thereafter the operator need take no further part in controlling the tractor, except to steer the tractor to ensure e.g straight furrows, and to engage and disengage the TICS control (if this is not accomplished automatically by the software) so that he may assume control during turning at each headland.

Figure 3:
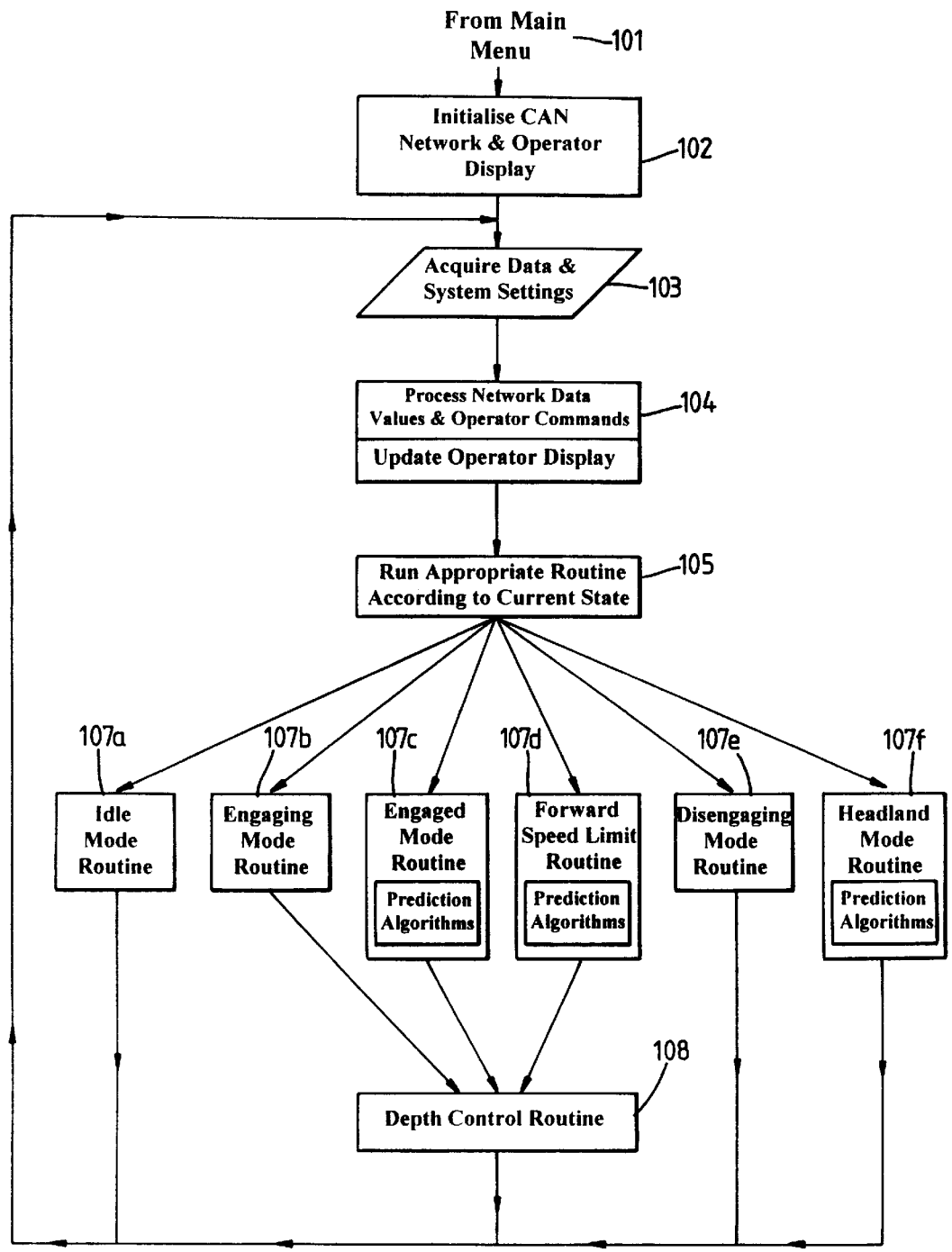
FIG. 3 is a block diagram showing in simplified form a preferred control program for implementing the invention in a tractor/plough combination.

Reference is now made to FIG. 3, that is a generalized flow diagram of a preferred embodiment of control software for use in apparatus and a method according to the invention. The embodiment of FIG. 3 concerns a tractor/implement combination in which the implement is a depth-adjustable plough, ie. an arrangement such as shown in FIG. 2. Thus the engaging mode routine block 107b of FIG. 3 calls a further subroutine (block 108) that automatically controls the depth of the plough to a constant level.

As is apparent from FIG. 3, following selection (step 101) of software control of the tractor from the main menu (that may be displayed on the cab-mounted display device), the software functions (step 102) to initialize a Controller Area Network (CAN) network and the operator display.

At step 103, the control program acquires prevailing data from the various subsystem sensors, and records the settings of various adjustable parameters of the tractor/implement combination. Such adjustable parameters may include, eg. the position of a switch for selecting and deselecting automatic (TICS) control of the tractor/implement combination.

At step 104, the control program processes the network data values and the operator commands, and updates the operator display as necessary. Subsequently (step 105) the software runs one of six subroutines, according to data input by the operator, and/or determined by progress through the control program.

Idle mode routine, represented at block 107*a*, simply causes the control program to loop back to block 103 at which the readings of data and system settings are updated and subsequently processed again at block 104. Thus, idle mode routine serves iteratively to check whether the operator has selected an automatic mode of control, thereby permitting implementation of such a mode without the need for further intervention from the operator.

Block 107*b* represents the "engaging mode" subroutine. This functions eg. before an initial pass of the tractor/implement combination along a field. The engaging mode routine represents an automatic mode of operation of the tractor/implement combination, ie. a transition mode that permits adjustment of the engine speed (to avoid stalling and over-revving of the engine); and that also permits transfer of control of the implement from a conventional apparatus (such as an electronic depth controller (EDC)) to the apparatus of the invention.

Once the control software has completed the engaging mode subroutine, the engaged mode subroutine (block 107*c*) operates automatically. In this subroutine, the automatic control employs prediction algorithms in conjunction with the steady state reference model in order to provide accurate feedback data, permitting the depth of the implement (block 108) to be kept constant while optimizing the other variable aspects of the vehicle.

Block 107*d*, a forward speed limit routine, is shown. This is an alternative mode of control that serves to limit the forward speed of the tractor/implement combination. As indicated, the forward speed limit subroutine includes prediction algorithms that are used in conjunction with the steady state reference model; and the subroutine itself calls the depth control routine.

The engaging mode routine, engaged mode routine and forward speed limit routine all have a control loop back to block 103 (acquisition of data and systems settings) after iteration through the depth control routine. Thus, while engaged mode is operative, the CPU 21 (FIGS. 1 and 2) stores data on the prevailing field conditions (ie. soil strength data in the preferred embodiment), thereby progressively improving the predictive accuracy of the subroutine.

At block 107*e*, there is shown a disengaging mode routine. The control flow in this subroutine bypasses the depth control routine 108, and returns control to the idle mode routine, when the operator de-selects the automatic control (TICS) mode of operation.

Finally, block 107*f* shows a subroutine designed to facilitate turning of the tractor/implement combination at the headland.

It is not possible for eg. a plough to remain lowered during turning at the headland. Subroutine 107*f* therefore permits bypassing of the depth control subroutine 108, and reversing the plough as necessary firstly to permit the tractor to turn safely at the headland; and secondly to ensure the correct direction of tilling of the soil as the tractor/implement combination commences a return pass along the field.

The subroutines 107*a* to 107*f* are called by the subroutine 105.

Figure 4:
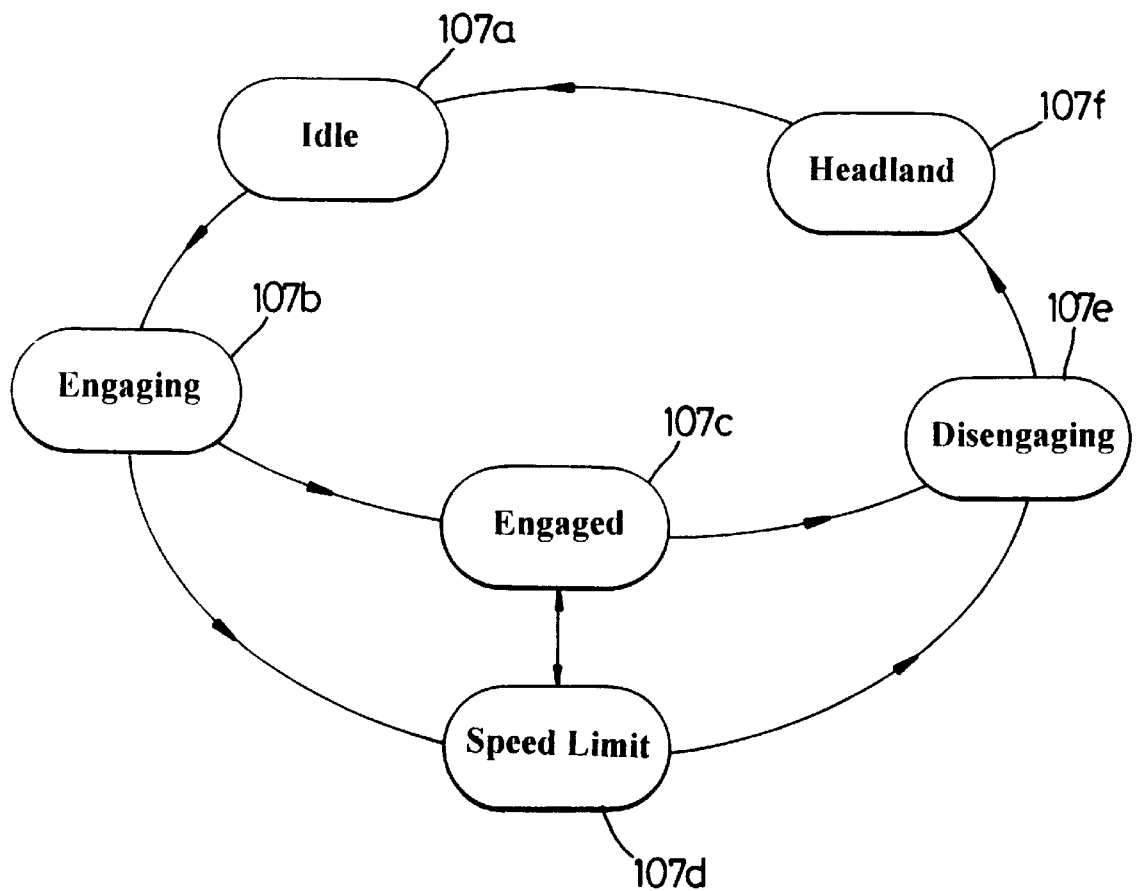
FIG. 4 is a block diagram showing the relationship between the principal sub-routines of FIG. 3.

The setting of adjustable parameters of the tractor/implement combination (eg. by virtue of the operator selecting a new item from a menu screen displayed in his cab) may cause overriding of the automatic operation of the control software, eg. to permit instantaneous switching from engaged mode routine (block 107*c*) via disengaging mode routine (block 107*e*) to idle mode routine (block 107*a*). FIG. 4 shows the relationship between the subroutines 107*a*–107*f*. In other words, FIG. 4 shows the order in which subroutines may be called by the software control block 105 of FIG. 3.

Thus, for example, it is only possible to engage idle mode, after a period of operation of engaged mode, by first calling the disengaging mode subroutine (block 107*e*); subsequently calling the headland mode subroutine (block 107*f*); and finally calling the idle mode subroutine (block 107*a*).

Figure 5:
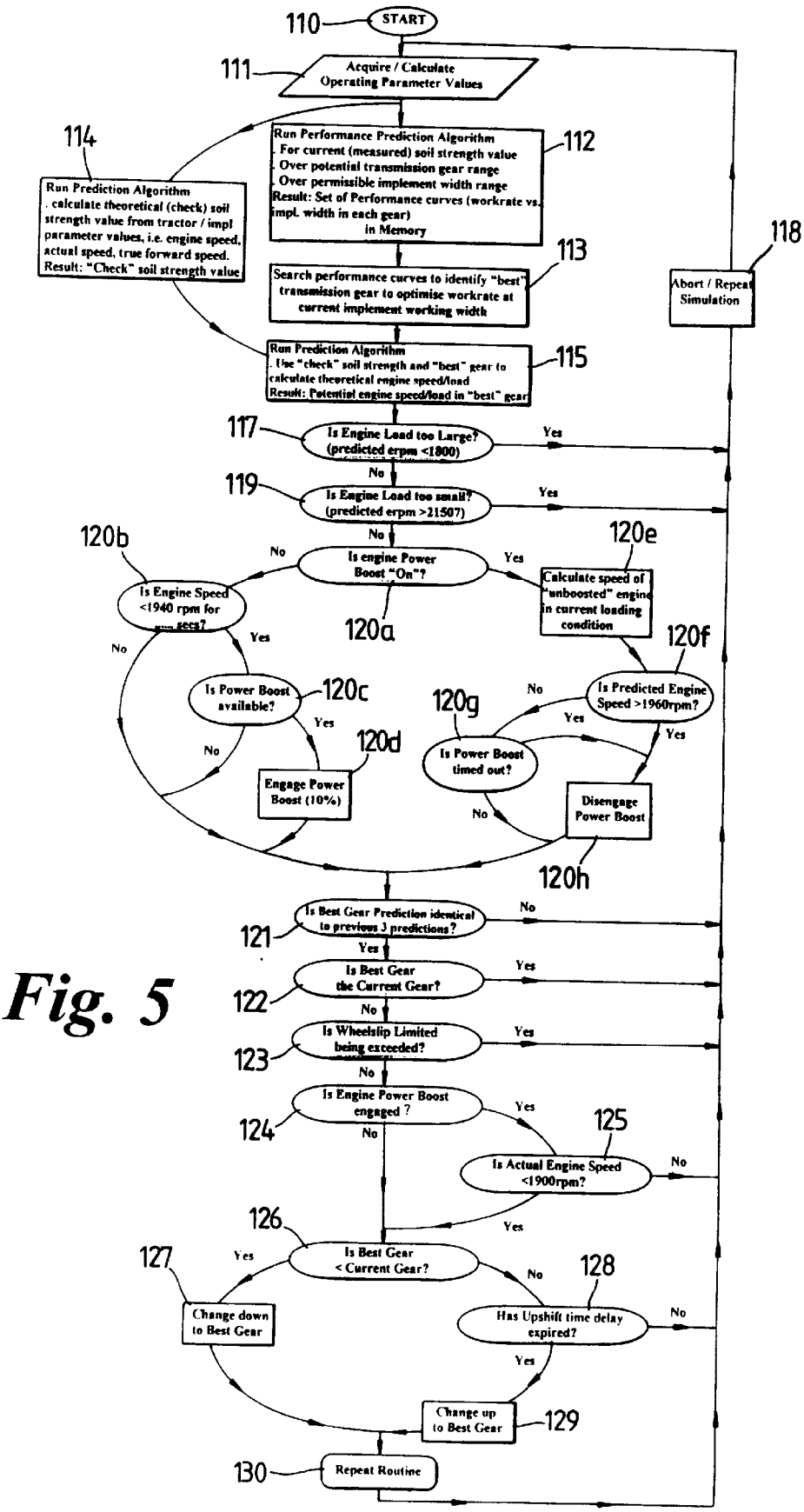
FIGS. 5 and 6 are detailed block diagrams illustrating two of the sub-routines of FIGS. 3 and 4.

Referring now to FIG. 5, the subroutine for engaged mode (ie. fully automatic control) is shown in more detail.

Following commencement of the subroutine (block 110) and the acquisition/calculation of operating parameter values (block 111), the subroutine runs a performance prediction algorithm (block 112); and (block 113) searches stored data representative of engine/transmission performance curves to identify the "best" transmission gear to optimize the work rate at the chosen (ie. current) implement working width.

In parallel with this determination, a prediction algorithm (block 114) is run to determine a theoretical ("check") soil strength value from the tractor/implement parameter values, ie. engine speed, actual speed, true forward speed.

At block 115, the "check" soil strength value and the best gear value are used to calculate the theoretical engine speed/load in the "best" gear.

If the engine load is too large (ie. there is a danger of engine stalling), the engine speed load and best gear determinations are repeated and/or the subroutine is aborted (blocks 117 and 118).

If on the other hand the engine load is too small (block 119) (ie. there is a danger of over revving the engine) the loop is again aborted and/or the iteration repeated (blocks 118 and 119).

If the engine load is within acceptable limits, the subroutine loops in order to determine whether a power boost facility (present in preferred embodiments of the tractor/implement combination) is available, and at what level, depending on the previous usage of the power boost facility and the current engine speed detected by the appropriate sensor.

Subsequent to the power boost routine, the subroutine then determines in real time (blocks 121-129) whether the predicted "best" gear (derived at block 115) is the current, selected gear. At block 127 or 129, the engaged mode subroutine causes a transmission shift as necessary to ensure that the current selected gear is the same as the best gear predicted at block 115. Finally, at block 130, the subroutine iterates indefinitely until the engaged mode subroutine is de-selected.

It should be emphasized that in the embodiment of FIG. 5 the subroutine is parameterized to operate with a constant implement working depth criterion. However, other basis for optimizing the tractor/implement combination work could equally well be programmed and the subroutine adjusted accordingly.

Figure 6:
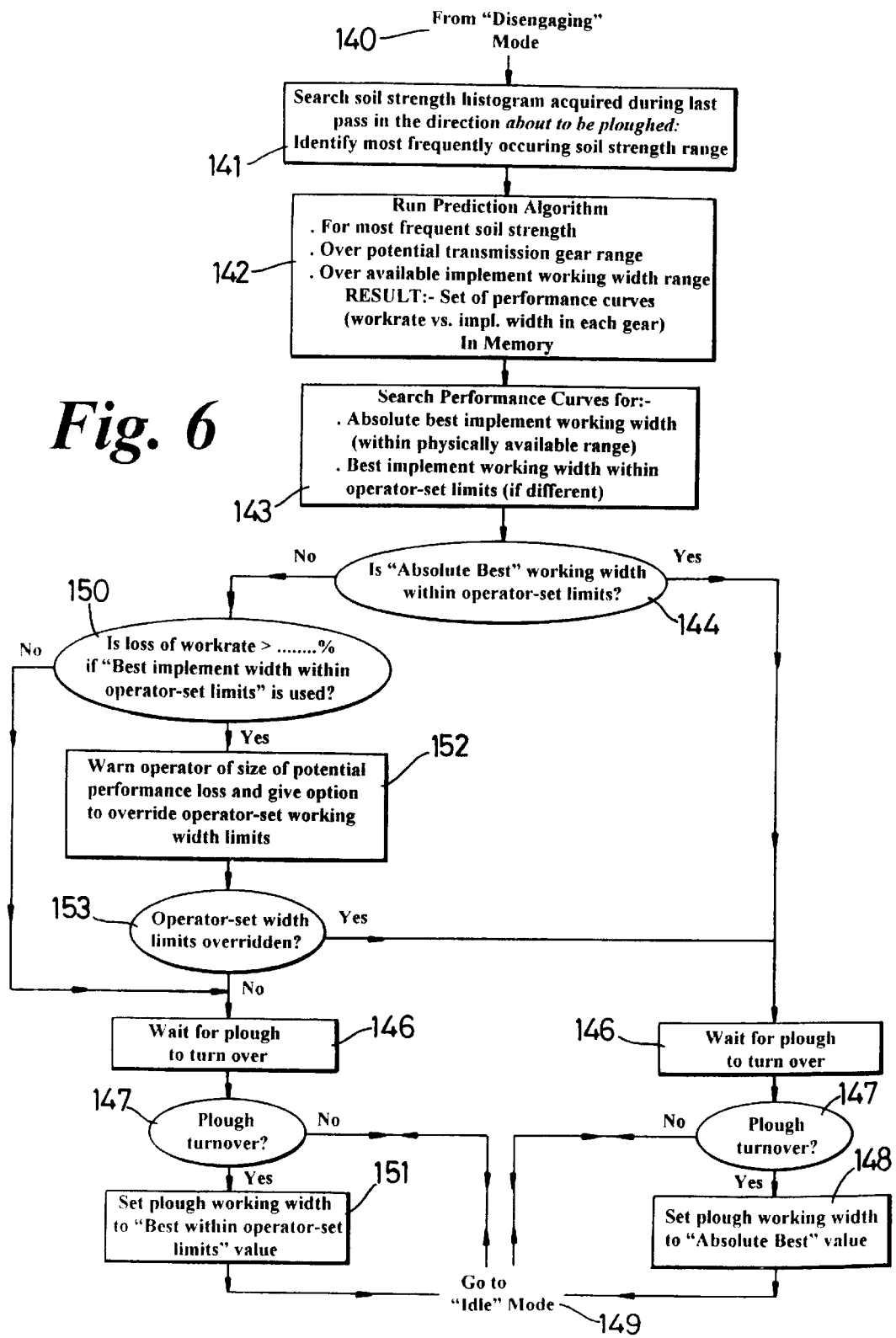

Referring now to FIG. 6, there is shown a flow diagram representative of the headland mode subroutine (block 107*f* of FIG. 3).

As is apparent from FIG. 4 and from block 140, headland mode is only run following operation of the disengaging mode subroutine.

At block 141, the headland mode subroutine searches the soil strength histogram acquired during the previous pass in the direction about to be ploughed, and identifies the most frequently occurring soil strength range.

Subsequently (block 142) the software runs a prediction algorithm to identify the most frequently encountered soil strength over the potential transmission gear range and over the available implement working width range. This results in a set of performance curves (work rate versus implement width in each gear) that is stored in the memory of the CPU.

At block 143, the performance curves are searched for the absolute best implement working width (ie. over the entire range of adjustment of implement working widths); and the best implement working width within operator-set limits (if they differ from the broad range referred to hereinabove).

A determination is then made (block 144) whether the absolute best working width lies within the operator-set limits. If the result of this determination is affirmative, at block 146, the software simply waits for the plough to turn over, tests whether this has occurred (block 147), sets the plough working width to "absolute best" value (block 148) and (block 149) reverts to idle mode preparatory to running of engaging, and then engaged modes (see FIG. 4).

If the determination, of whether the absolute best working width is within the operator-set limits, is negative, the software then calculates whether the loss of workrate, resulting from failure to use the "absolute best" working width, is greater than a predetermined percentage (block 150). If the result of this determination is negative, the software waits for the plough to turn over, checks for plough turn over, sets the plough width to the best within operator-set limits value and reverts to idle mode (blocks 146, 147, 151 and 149).

If on the other hand the loss of work rate determined and block 150 is excessive, a warning indication is made (eg. via the operator display in the preferred embodiment) to the operator (block 152) that the potential performance loss is great. The operator is then given the option of overriding the operator-set working width limits in order to optimize workrates.

If (block 153) the operator overrides the previous operator-set width, steps 146, 147, 148 and 149 are repeated. If this results in an acceptable absolute best working width calculation, the subroutine reverts to idle mode preparatory to running of engaging and engaged modes.

If the operator chooses not to override the previous operator-set limits at block 153, the software waits for the plough to turn over (block 146), checks for plough turnover (block 147); sets the plough working width to the best available working width within the range of operator-set limits (block 151) and reverts to idle mode preparatory to engagement of engaging and then engaged modes.

Figure 9:
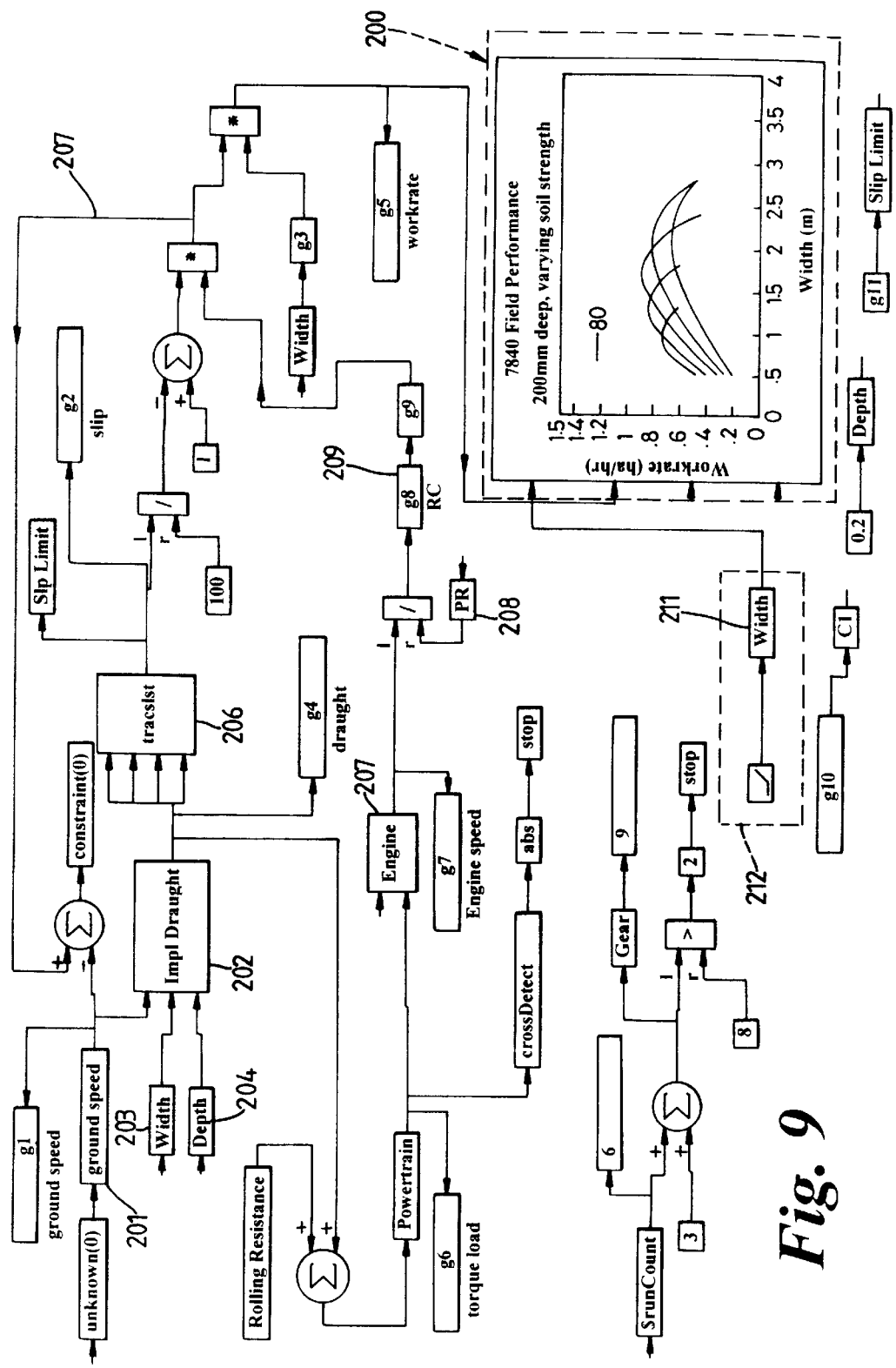
FIGS. 9 and 10 show in schematic form the preferred methods by which the steady state reference model forming part of the invention may be generated.

Referring to FIG. 9, there is shown a further block diagram. This illustrates the relationship between the steady-state reference model (shown schematically as graph 200) and the various outputs from sensors positioned on the sub-systems of a tractor/implement combination such as that shown in FIG. 2. Thus FIG. 9 attempts to show how a mixture of variable (dynamic) and steady state inputs are processed for comparison against any modification of the steady state reference model.

The steady state reference model 200 is referred to in block 112 of FIG. 5, as a set of performance curves relating workrate to implement width in each gear. Typical performance curves are shown in FIG. 9. Of course in reality the performance curves are stored as bits of data in CPU 21.

Those skilled in the art will recognize that FIG. 9 shows an iterative loop around which data from the sensors are passed by the control software, following scaling as necessary by means of gain terms (represented by letters g1–g11 in FIG. 9) and combining in logical operations with other data.

The performance curves are, of course, updated with each pass around the loop of FIG. 9, whereby to take account of changes in conditions experienced by the tractor/implement combination. For the avoidance of doubt, repeated updatings of the reference model do not in themselves mean that the model is dynamic. Rather, the control software is such that the model is invariant for any given iteration around the FIG. 9 loop.

Thus, for example, data on the vehicle ground speed (input at block 201) are inputs to an implement draught subroutine 202, together with data on the implement depth (203) and width (204). The output of this algorithm is an input to subsequent algorithm 206 that calculates the wheelslip of the vehicle. The output of algorithm 206, after further mathematical processing, is combined with the outputs of further algorithms such as engine performance calculation algorithm 207, data on the powertrain reduction ratios of the vehicle (block 208) and the tire rolling resistance (209). The result of this processing is to render the vehicle performance data as measured by the sensors in a form suitable for comparison against the graphical model 200. Measured data on e.g. the implement width are processed in the FIG. 9 embodiment in an analogous manner.

If the software detects any significant difference between the current ground speed value and the reference model value, the pass around the FIG. 9 loop is repeated using a revised value for the implement draught (taking account of the real time measurement eg. from the microprocessor 48 of FIG. 2) whereby to modify the model. This general process is repeated until the measured and reference ground speed values converge to within acceptable limits. The reference model 200 then remains unchanged until in a subsequent clock period the software detects a significant different between the actual and reference (theoretical) ground speed values.

A preferred iterative process by which the software compares the actual and model ground speed values is described in greater detail below.

The specific actions performed by the model are as follows:

values for soil strength (C1), working depth and wheelslip limit are specified manually;
the model is initiated, with the following initial conditions:
implement draught=static draught only
wheelslip=zero
transmission gear=4th
working width=minimum of allowable range (0.5–3.5 m)

With reference to FIG. 9, the following calculation procedure is then performed:

1) Determine slip corresponding to implement static draught value;
2) Using static draught value, determine total axle torque load and add rolling resistance component;
3) Calculate engine torque load (in current transmission gear ratio) and determine corresponding engine speed;
4) Derive theoretical forward speed estimate: incorporate slip value from (1) to determine initial ground speed estimate;
5) Calculate revised estimate of implement draught, incorporating dynamic draught component corresponding to ground speed estimate;

6) Revised slip estimate for new draught value (=static+ dynamic components);
7) Revised axle torque and engine torque load estimates;
8) Calculate new engine speed value;
9) Calculate new theoretical forward speed and ground speed values;
10) Revise dynamic draught value and calculate new total draught estimate.

Steps (6) to (10) are repeated until successive ground speed estimates converge ie. only a small difference exists between them. The implement width value is then incremented slightly (0.1 m) and the calculation process repeated. When the entire implement working width range has been covered (or wheelslip or engine torque limits exceeded), the transmission gear value is incremented and the prediction process repeated once more.

Figure 10:
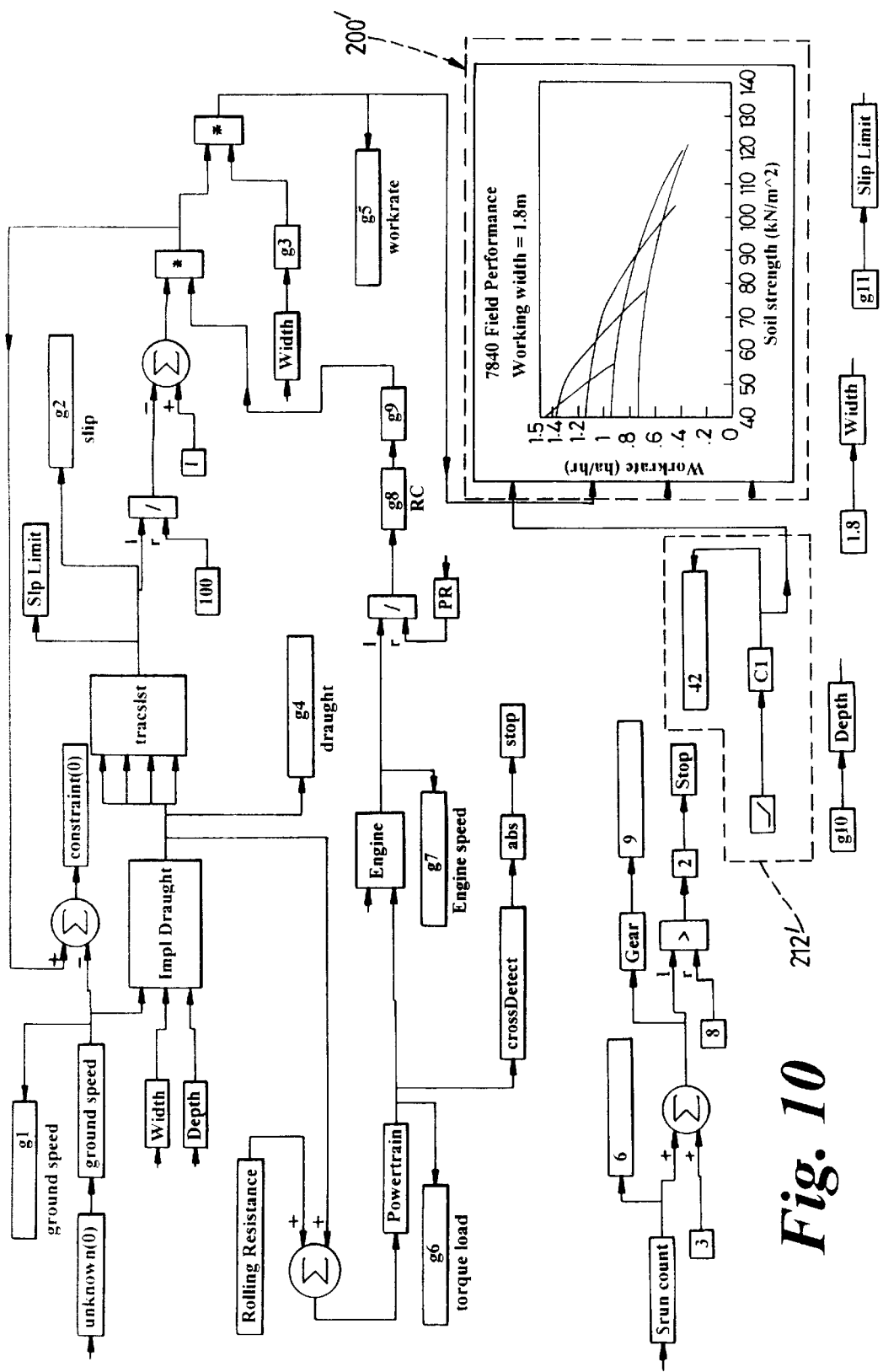

The portion 212 of FIG. 9 that represents processing of the implement width data can be modified as shown by portion 212' of FIG. 10, to cater for constant implement width. This of course is likely to be the way that the apparatus of the invention is set up in practice, since most users are believed unlikely to accept a control apparatus that constantly varies the width of e.g. a tillage implement during operation.

The FIG. 10 block diagram results in a model 200' that is a set of performance curves of workrate against soil strength, for a given (fixed) implement width (1.8 m in the example shown in FIG. 10, although other constant implement width reference models could equally well be produced).

As FIG. 10 illustrates, the performance curves constituting the steady state model define a series of set points corresponding to various soil strength values. In use of the apparatus of the invention, the control software determines which of the soil strength values stored in the model is closest to the actual soil strength measured by the relevant sensors attached to the vehicle/implement combination. The performance curve corresponding to this soil strength value is used to define the set point of the system at a given instant, until a subsequent data input from the sensors indicates that a different soil strength value should be used. This process forms part of the sequence described e.g. in FIG. 5.

The following table is a glossary of the abbreviations used in FIGS. 9 and 10:

| TERM | EXPLANATION |
| --- | --- |
| ground speed | tractor forward speed (km/h) |
| Width | plough working width (m) |
| Depth | plough working depth (m) |
| Impl Draught | plough draft calculation routine |
| tracsist | wheelslip calculation routine |
| Slp Limited | excessive wheelslip trapping routine |
| slip | traction interface wheelslip (%) |
| draught | plough draught (kN) |
| Rolling Resistance | tractor rolling resistance (kN) |
| Powertrain | Powertrain performance calculation |
| torque load | tractor engine torque load (N.m) |
| Engine | engine performance calculation |
| Engine Speed | tractor engine speed (rev/min) |
| PR | powertrain reduction ratio |
| RC | rear type rolling circumference (m) |
| workrate | tractor-implement workrate (ha/hr) |
| $runCount | transmission gear increment routine |
| Gear | tractor tranmission gear |
| C1 | static draught coefficient (kN/m$^2$) |
| Slip Limited | manually - specified slip limit |

There now follows an example of testing of a tractor/implement combination according to the invention against a standard tractor implement combination.

EXAMPLE

This investigation attempted to assess the relative in-field workrates of two New Holland Ford 7840 SLE (Quad Mod) 4wd tractors, each coupled to a Dowdeswell five furrow variable-width reversible plough, operating in prevailing autumnal field conditions. Steps were taken to ensure/confirm that both tractors were almost identical in terms of power take off (p.t.o.) and drawbar power output, and were very similar in terms of other significant factors (tire sizes, tire pressures, ballast levels, weight distribution). The test tractors differed only in as much as one was a standard production machine and the other was fitted with the experimental Tractor Integrated Control System (TICS) according to the invention, incorporating an electronic engine control system and hierarchical Central Control Unit (CCU) operating model-referenced control software to maximize tractor-implement workrate. Both vehicles were operated together, in a competitive manner, throughout a series of fields, during which their respective workrates were recorded. Measurements of this nature were performed over an eight-working-day period, following which the respective performances of the machines were analyzed and the potential benefit of the TICS feature determined.

A microprocessor-based electronic diesel fuel injection control system was fitted to the TICS vehicle to permit remote control of engine speed and power output. This is control system also incorporated a software-selectable "power boost" feature, which enabled up to 10% additional fuel volume to be supplied to the engine for limited periods of time. The standard Quad Mod Transmission/Hitch electronic control unit (ECU) was modified by the addition of a CAN interface, to allow communication with the Tractor Network.

As far as the operator was concerned, having specified some initial settings at the beginning of the day (target ploughing depth, minimum & maximum furrow width, size of plough), use of the TICS tractor was relatively conventional. Upon setting into a field at the headland furrow mark (assuming an open furrow already existed), having lowered the plough in the normal way (using the EDC fast raise/lower switch) and with the tractor in motion the TICS system was engaged (by means of a conveniently located switch). The tractor engine was then automatically accelerated to rated speed and the transmission gear incremented (within the powershift range) until the correct selection for maximum performance (as determined by the CCU) was achieved. The working depth of the plough was maintained at the operator-selected level by means of the EDC system (which is operated automatically in "position control"), working depth being determined from a plough-mounted sensor. Only if wheelslip exceeded a maximum value specified by the operator (via the standard EDC control panel) was the plough depth reduced, and then by standard New Holland EDC wheelslip limitation software.

If soil strength should increase the CCU responded by temporarily boosting the engine power output and/or selecting a lower transmission gear. Conversely a reduction in soil strength would usually result in an automatic up-shift. Only at the next headland turn, immediately after reversing the plough, was the furrow width adjusted to a value which, in the view of the CCU, was most likely to produce optimum workrate during the return pass back down the field.

This particular value was determined by logging soil strength values during the initial pass up the field, analysing their distribution and selecting the most frequently occurring value.

Steps were taken prior to field testing, to ensure the test tractors were largely identical in terms of p.t.o. & drawbar power output, front/rear tire sizes, inflation pressures, & ballast levels and front/rear weight distribution. Similar attention was paid to the ploughs provided for the investigation, to ensure similarity in terms of construction & weight distribution, and plough body & skim types fitted.

Having eliminated, or at least restricted, as many hardware variables as was practicable, the likely causes of field performance variation which remained (with the exception of the weather) were driver skill/ability and in-field soil type variation. In order to minimise the effects of these parameters the field performance testing of the tractor/plough combinations was undertaken in the following manner:

i) Each vehicle was assigned an operator who (after initial familiarisation) operated the vehicle for approximately 6 hours per day for 4 consecutive days. The driver of the standard tractor-plough was instructed to operate the machine in a manner which he considered would maximise vehicle performance, whilst producing an agronomically-acceptable quality of work. The driver of the TICS tractor relied upon the on-board control system (s) to fulfil these objectives.

ii) Both tractor-plough combinations were paired to operate together in a succession of fields (numbering 14 in total), in such a way as to ensure that one did not hinder the progress of the other, but that each was subject to comparable in-field variations of soil cultivation resistance and traction conditions. This was achieved in practice by setting up a "ridge" (of the type used in "conventional" ploughing) in the middle of each test field. Each tractor & plough was then set to work in the open furrows on opposite sides of the ridge. Every 2 hours the vehicles exchanged operating positions in the test field, until the latter was completed. The procedure was then repeated in subsequent fields. Marking-out and headland work were performed independently of the test machines.

iii) An observer was present throughout the tests in order to monitor the quality of work produced by each machine (to ensure its agronomical acceptability in the prevailing conditions), and to determine respective workrates (area ploughed per nominal 2 hour period). Also, a daily record was kept of fuel use and recorded engine hours.

iv) After completion of the first 4 day test period, the drivers exchanged tractors and the tests were repeated for a further 4 consecutive days, in order to minimise the effects of any differences in driver skill and ability.

Data recorded included during the field performance trials included:

i) area ploughed per time period (nominally 2 hours);

ii) duration of time period;

iii) fuel used per working day for each test vehicle.

This information was entered into a computer spreadsheet package and analysed to enable calculation of:

i) workrate—for each period, day, week, field, and for the entire test;

ii) specific fuel consumption (liters/hectare)—for each day, week, and for the entire test.

These results are summarised below in Table 2.

TABLE 2

Summary of results obtained from field performance tests

|  | Parameter | Standard Tractor (T.14) | TICS Tractor (T.491) | % Difference (T.14 Base) |
|---|---|---|---|---|
| Week 1 | Area Ploughed (ha) | 28.82 | 32.61 | +13.13% |
|  | Mean Workrate (ha/hr) | 1.068 | 1.208 | +13.13% |
|  | Mean Specific Fuel Consumption (l/ha) | 17.1 | 15.6 | −8.8% |
| Week 2 | Area Ploughed (ha) | 21.59 | 22.8 | +5.64% |
|  | Mean Workrate (ha/hr) | 1.273 | 1.345 | +5.64% |
|  | Mean Specific Fuel Consumption (l/ha) | 16.4 | 15.8 | −3.7% |
| Overall Mean Workrate (ha/hr) |  | 1.147 | 1.261 | +9.92% |
| Overall Mean Specific Fuel Consurnption (l/ha) |  | 16.8 | 15.7 | −6.5% |

Figure 7:
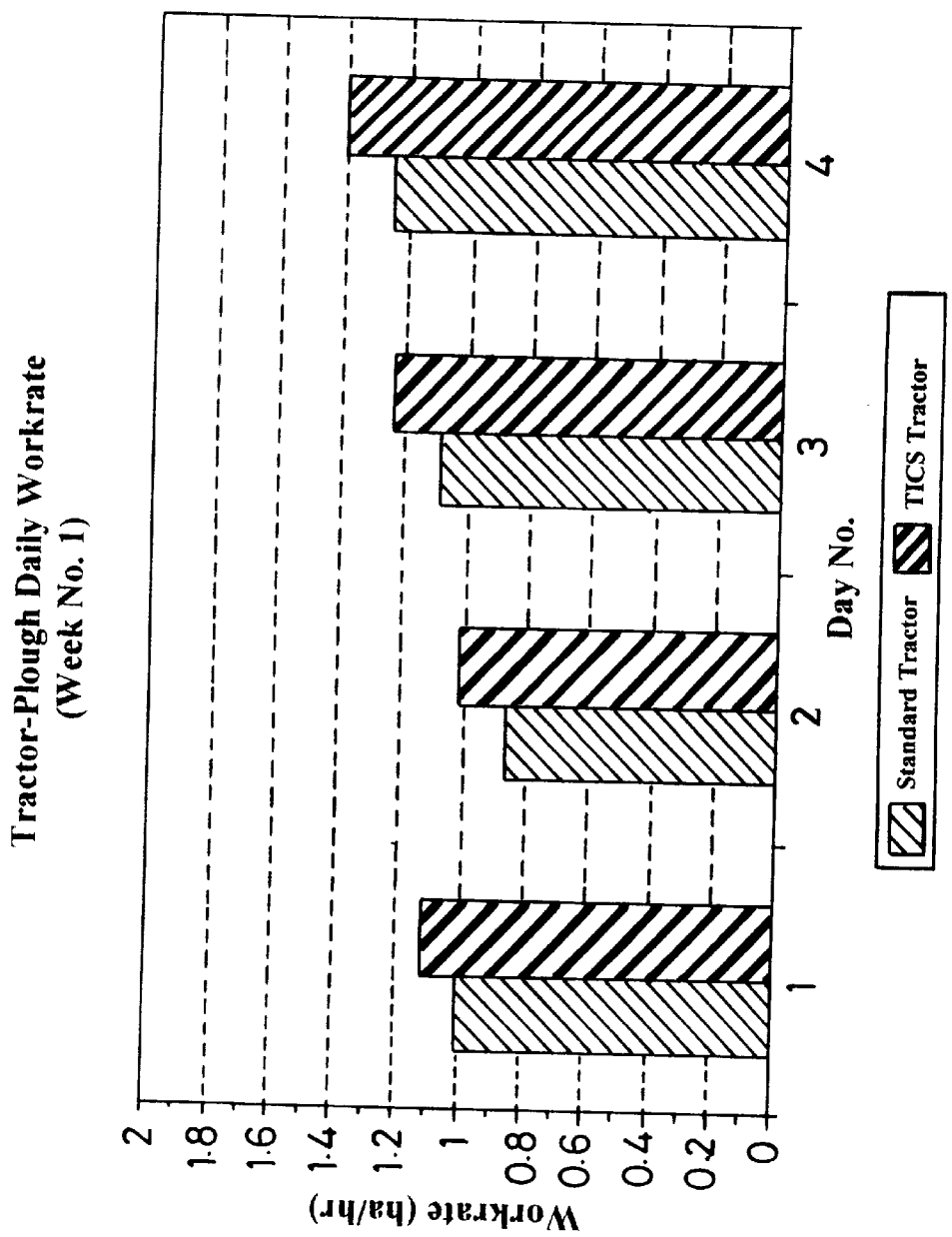
FIGS. 7 and 8 show the results of comparative trials of a tractor/implement combination according to the invention; and a standard tractor/implement combination.
Figure 8:
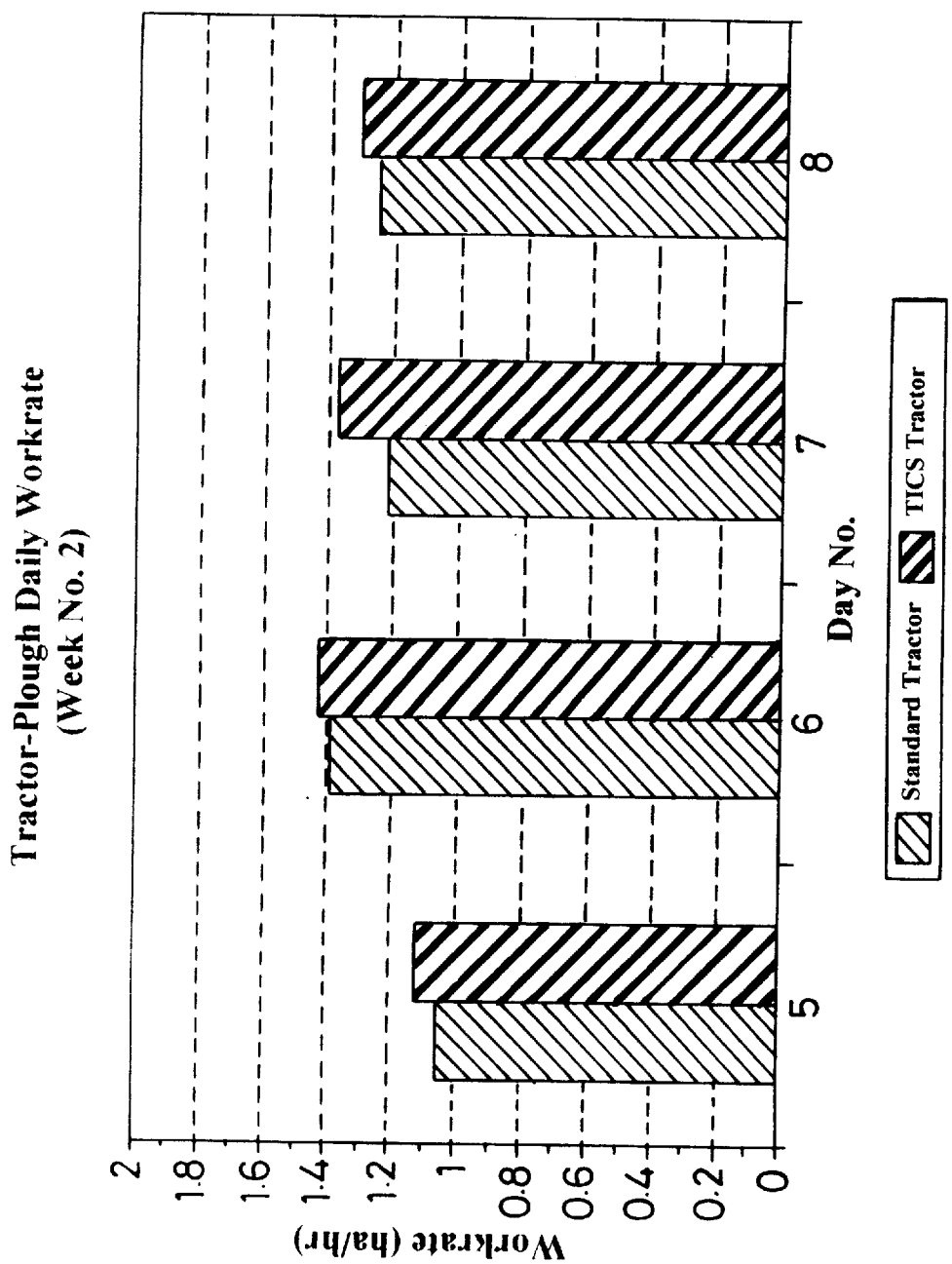

FIGS. 7 and 8 show the performance improvements attributed to the invention in graphical form.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

Having thus described the invention, what is claimed is:

1. Apparatus for controlling a land vehicle, comprising:

a programmable controller including stored therein data representative of a reference model of the vehicle's performance, said data including vehicle tractive efficiency data which includes parameters on traction characteristics of a vehicle having a chosen wheel and tire combination when moving on a selected land surface;

a slave controller operatively connectable to each of a plurality of controllable sub-systems of a said vehicle, and operatively connected to the programmable controller;

one or more sensors, operatively connected to the programmable controller, for detecting the performance of said controllable sub-systems; and a comparator for comparing the detected performance of the said controllable sub-systems and the reference model, the controller being operable to control the said sub-systems in dependence on an output of the comparator, characterised in that the reference model is a steady-state model, whereby to permit co-ordinated, automated control of all the said sub-systems.

2. The apparatus of claim 1 wherein said data representative of a reference model of vehicle performance further includes parameters selected from the set of:

engine performance data;

selected vehicle transmission ratio data;

said vehicle tractive efficiency data; and data on the setting of a vehicle-powered implement.

3. The apparatus of claim 2 wherein the model includes data, representative of the effect on vehicle performance, of the entire said set of data.

4. The apparatus of claim 3 wherein the engine performance data includes engine torque-speed data.

5. The apparatus of claim 4 wherein the engine performance data includes engine power-speed data.

6. The apparatus of claim 5 wherein the engine performance data includes engine governor setting data.

7. The apparatus of claim 6 wherein the engine performance data is adjusted for vehicle driveline losses.

8. The apparatus of claim 7 wherein the selected vehicle transmission ratio data is adjusted for vehicle driveline losses.

9. The apparatus of claim 8 wherein adjustment of the selected vehicle transmission data is dependent on the selected transmission ratio to which such adjustment pertains.

10. The apparatus of claim 9 wherein the vehicle tractive efficiency data includes data on the rolling resistance of a vehicle tire.

11. The apparatus of claim 10 wherein the vehicle tractive efficiency data includes data respectively on the efficiency of traction of the front and rear wheels of a wheeled vehicle.

12. The apparatus of claim 11 wherein the data on the tractive efficiency of the said front and rear wheels are combined to provide composite traction data during use of the apparatus.

13. The apparatus of claim 12 wherein the vehicle tractive efficiency data includes data selected from the set of:

soil type;

initial vehicle axle loads;

vehicle tire dimensions; and vehicle tire coefficient of rolling resistance.

14. The apparatus of claim 13 wherein the data on the setting of a vehicle-powered implement includes data representative of the setting of an adjustable implement operatively mounted on an implement hitch of a tractor.

15. The apparatus of claim 14 wherein the data representative of the implement setting includes data representative of parameters selected from the set of:

implement width; and implement depth setting.

16. The apparatus of claim 15 including a display device for indicating the performance of a vehicle to which the apparatus is connectable.

17. The apparatus of claim 16 wherein the programmable controller and each of the slave controllers is constituted as a microprocessor, the microprocessors being operatively interconnected to one another.

18. The apparatus of claim 17 wherein the controllable sub-systems are selected from the set of:

an engine output controller;

a transmission ratio selector;

an adjustable implement controller; and a tractor implement hitch controller.

19. The apparatus of claim 18 including or operatively connected to an engine power boost apparatus.

20. The apparatus of claim 18 including means for recording data in real time on one or more characteristics of a surface over which a vehicle incorporating the apparatus may travel.

21. The apparatus of claim 20 wherein the means for recording data is capable of recording data on soil strength.

22. The apparatus of claim 21 wherein the steady state reference model corresponds to a set of curves or table of data indicative of the performance of the tractor/implement combination in prevailing field conditions.

23. The apparatus of claim 18 wherein the adjustable implement controller is connected to one or more of the following classes of implement:

a cultivation implement;

a crop establishment implement;

a material application implement;

a crop harvesting implement; and a materials handling implement.

24. A method of controlling an agricultural tractor, including an adjustable, vehicle-powered soil tillage implement, comprising the steps of:

initiating a control apparatus having a programmable controller including stored therein data representative of a reference model of the vehicle's performance;

a slave controller operatively connectable to each of a plurality of controllable sub-systems of a said vehicle, and operatively connected to the programmable controller;

one or more sensors, operatively connected to the programmable controller, for detecting the performance of said controllable sub-systems; and a comparator for comparing the detected performance of the said controllable sub-systems and the reference model, the controller being operable to control the said sub-systems in dependence on an output of the comparator, characterized in that the reference model is a steady-state model, whereby to permit co-ordinated, automated control of all the said sub-systems;

inputting to the control apparatus a set value of an adjustable characteristic of or associated with the implement, said adjustable characteristic being the tilling depth of the implement below a soil surface level; and operating the vehicle under control of the control apparatus, the control apparatus maintaining the adjustable characteristic of the implement at said set value while simultaneously automatically adjusting one or more sub-systems of the vehicle to optimize a performance parameter thereof.

25. The method of claim 24 wherein the step of adjusting one or more sub-systems of the vehicle includes the step of adjusting the working width of the tillage implement.

26. The method of claim 25 further comprising the step of partially deactivating the control apparatus during turning of the tractor in the headland.

27. The method of claim 26 wherein the performance parameter of the vehicle is selected from workrate, fuel consumption, and wheel slip.

28. The method of claim 27 further comprising the step of recording in the control apparatus one or more characteristics of operation of the vehicle under contemporaneously prevailing conditions.

29. The method of claim 26 further comprising the step of modifying the subsequent behaviour of the vehicle in dependence on the recorded characteristics.

30. The method of claim 29 wherein the step of modifying the subsequent behaviour of the vehicle includes the sub-step of analysing the recorded characteristics during said partial deactivation of the control apparatus.

31. The method of claim 30 wherein the step of operating the vehicle under the control of the control apparatus occurs after a further step of engaging the soil tillage implement with the soil to a predetermined depth.

32. The method of claim 31 further comprising the step of disengaging the soil tillage implement from the soil after operation of the vehicle under control of the control apparatus.

33. The method of claim 32 further comprising the step of, during operation of the vehicle under control of the control apparatus, boosting the power output of the vehicle engine.

34. The method of claim 33 wherein the step of boosting the engine power occurs in dependence on the prevailing engine loading and the extent to which the engine power has previously been boosted in a predetermined, preceding period.

35. The method of claim 34 wherein the degree of engine power boost is adjustable.

36. The method of claim 26 wherein the step of operating the vehicle under control of the apparatus includes the sub-steps of:

determining a theoretical optimum transmission ratio for the vehicle under prevailing conditions and in dependence on characteristics of the vehicle stored in the control apparatus;

determining whether under prevailing conditions the optimum transmission ratio is selected; and, depending on the outcome of the determination under step (ii); and altering the selected transmission ratio as necessary.

37. The method of claim 36 further comprising the steps of:

specifying settings of an adjustable characteristic of the vehicle/implement combination; and operating the control apparatus to determine an optimum setting of the said characteristic, whereby in the event of the optimum setting being unattainable as a result of said operator-specified settings the operator may either re-specify said settings or override the requirement of the control apparatus to alter the selected setting to the optimum one.

38. The method of claim 37 wherein said adjustable characteristic is the width of a plough.

39. The method of claim 38 further comprises the step of automatically adjusting the width of the plough.

40. The method of claim 39 wherein the step of adjusting the width of the plough occurs after turning over of the plough in the headland.

41. The method of claim 40 wherein the step of the operator re-specifying the adjustable setting or overriding the control apparatus occurs in dependence on the loss of workrate efficiency of the vehicle/implement combination, through inability to attain the optimum said setting, being greater than a predetermined maximum.

42. The method of claim 41 wherein the step of optimising said performance parameter includes the sub-step of comparing the real time performance and/or characteristics of the vehicle and/or prevailing field conditions with a steady state reference model of the vehicle performance and/or characteristics.

43. The method of claim 30 further comprising the step of processing the data on the recorded characteristics in an iterative manner in order to render them in a form suitable for iterative comparison with and/or modification of the steady state reference model.

44. The method of claim 43 wherein the iterative processing of the said data and the iterative comparison with the steady state reference model includes the step of comparing the actual ground speed of the vehicle with the theoretical ground speed thereof recorded for the time being in the model.

45. The method of claim 44 further comprising the step of modifying the steady state reference model in the event of the actual and theoretical ground speed values differing by more than a predetermined amount.

* * * * *